(12) United States Patent
Murayama et al.

(10) Patent No.: US 8,286,259 B2
(45) Date of Patent: Oct. 9, 2012

(54) NETWORK PROJECTOR INCLUDING A DISPLAY SIGNAL CONTROL UNIT, AND PROJECTOR SYSTEM INCLUDING THE NETWORK PROJECTOR

(75) Inventors: Shuji Murayama, Tokyo (JP); Masaki Kitagawa, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 472 days.

(21) Appl. No.: 12/312,143

(22) PCT Filed: Oct. 26, 2007

(86) PCT No.: PCT/JP2007/070924
§ 371 (c)(1),
(2), (4) Date: Apr. 28, 2009

(87) PCT Pub. No.: WO2008/053807
PCT Pub. Date: May 8, 2008

(65) Prior Publication Data
US 2010/0083388 A1    Apr. 1, 2010

(30) Foreign Application Priority Data
Oct. 30, 2006   (JP) ................................. 2006-294274

(51) Int. Cl.
*H04L 29/06* (2006.01)
(52) U.S. Cl. .......................................... 726/34; 726/36
(58) Field of Classification Search .................... 726/35, 726/36, 34; 713/500–502, 600, 601
See application file for complete search history.

(56) References Cited

U.S. PATENT DOCUMENTS

| | | | | |
|---|---|---|---|---|
| 4,742,357 A | * | 5/1988 | Rackley | 342/457 |
| 5,153,917 A | * | 10/1992 | Kato | 726/35 |
| 7,190,264 B2 | * | 3/2007 | Brown et al. | 340/539.23 |
| 7,806,938 B2 | * | 10/2010 | Ng et al. | 726/35 |
| 2002/0113952 A1 | | 8/2002 | Matoba et al. | |
| 2003/0204749 A1 | | 10/2003 | Pugh et al. | |
| 2004/0119945 A1 | | 6/2004 | Nakamura et al. | |
| 2005/0264772 A1 | | 12/2005 | Masukawa | |
| 2006/0187425 A1 | | 8/2006 | Matoba et al. | |

FOREIGN PATENT DOCUMENTS

| | | |
|---|---|---|
| JP | 2000-259274 | 9/2000 |
| JP | 2002-247539 | 8/2002 |
| JP | 2002-287242 | 10/2002 |
| JP | 2003-122458 | 4/2003 |
| JP | 2004-46798 | 2/2004 |
| JP | 2004-69997 | 3/2004 |
| JP | 2004-77967 | 3/2004 |
| JP | 2004-118488 | 4/2004 |
| JP | 2004-178608 | 6/2004 |
| JP | 2005-156747 | 6/2005 |
| JP | 2005-301177 | 10/2005 |
| JP | 2005-338604 | 12/2005 |
| JP | 2006-285072 | 10/2006 |

\* cited by examiner

*Primary Examiner* — Edward Lee
(74) *Attorney, Agent, or Firm* — McGinn IP Law Group, PLLC

(57) ABSTRACT

The present invention aims to provide a network projector which has a simple security function via a network. The network projector comprises a power source unit which supplies power to the network projector and a display signal control unit which, when confirming that a connection confirmation signal which is transmitted at a fixed period from a host computer via a network is not inputted for more than a predetermined time, outputs a supply stop signal to the power source unit indicating that the supply of power should be stopped.

14 Claims, 2 Drawing Sheets

NETWORK PROJECTOR INCLUDING A DISPLAY SIGNAL CONTROL UNIT, AND PROJECTOR SYSTEM INCLUDING THE NETWORK PROJECTOR

TECHNICAL FIELD

The present invention relates to a network projector and a projector system provided with a security function.

BACKGROUND ART

A projector is used widely in a presentation of a conference etc., because the projector can project and display enlarged pictures. The projector and a picture output apparatus which have been generally used is in a one-to-one relationship. However, recently, a plurality of projectors is often used and managed via a network in companies, schools etc. where projectors are installed in a plurality of rooms.

Parts necessary for periodic maintenance such as lamps, air filters etc. are used in a projector. Therefore, it is convenient for a system manager to manage each projector via a network.

For example, a centralized management method for the projectors of the network system which includes projectors is disclosed in Japanese Patent Laid-Open No. 2002-287242 (hereinafter referred to Document 1).

In the method described in Document 1, providing a projector with a hub for a network makes it easy to structure a network system. After structuring a network system, centralized management of the projectors via the network is possible.

In addition, an apparatus for detecting that a LAN cable is plugged or unplugged from a LAN cable connector, and for detecting removal of devices from a network is disclosed in Japanese Patent Laid-Open No. 2003-122458 (hereinafter referred to Document 2).

The apparatus described in Document 2, when a LAN cable is unplugged from a LAN cable connector, stops supplying power to LAN interface unit. Thereby, it provides an apparatus capable of reducing power consumption.

There is concern over the possibility of theft of the projector, described in Document 1, from the room at times when no one is present, such as, for example, at night.

In the network system described in Document 1, the stolen projector will be used again as a network projector, if the stolen projector is connected to a network at other place. In addition, the stolen projector will be used alone, if the stolen projector is not connected to a network. Therefore, security measures to prevent theft are not considered necessary.

In the invention described in Document 2, whether a LAN cable is plugged or unplugged from a LAN cable connector can only be physically detected. Therefore, even if the invention described in Document 2 is used, there are no effective security measures to prevent theft.

Furthermore, it is considered that USB memory etc. is used as a key for security. In this case, management tasks are complicated for a manager, because it is necessary to manage a projector and a USB memory separately.

DISCLOSURE OF THE INVENTION

An exemplary object of the present invention is to provide a network projector and a projector system provided with a simple security function via a network, in order to solve the above described problems.

In order to achieve the above exemplary object, the projector of an exemplary aspect of the invention is a network projector connected with a host computer via a network, comprising: a power source unit which supplies power to the network projector; and a display signal control unit which, when confirming that a connection confirmation signal, which is transmitted at a fixed period from a host computer via a network, is not inputted for more than a predetermined time, outputs a supply stop signal to the power source unit indicating that the supply of power should be stopped.

In order to achieve the above exemplary object, the projector system of an exemplary aspect of the invention is a projector system comprising a network projector and a host computer connected via a network: wherein, the host computer comprises: a control unit which transmits a connection confirmation signal at a fixed period via the network, and the network projector comprises: a power source unit which supplies power to the network projector; and a display signal control unit which, when confirming that a connection confirmation signal is not inputted for more than a predetermined time, outputs a supply stop signal to the power source unit indicating that the supply of power should be stopped.

BEST MODE FOR CARRYING OUT THE INVENTION

A configuration of a projector of an exemplary embodiment of the present invention will be described.

Figure 1:
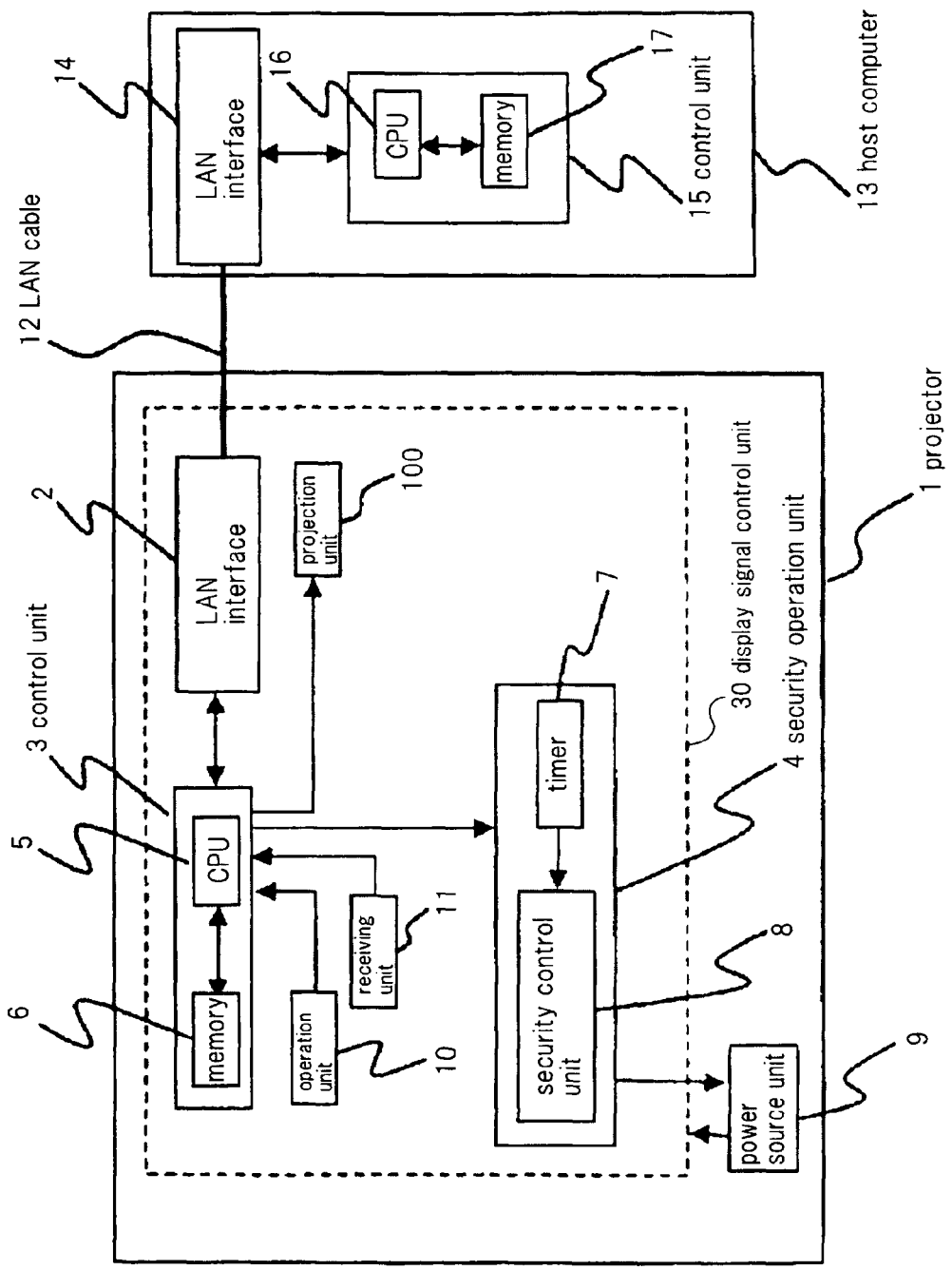
FIG. 1 is a block diagram of a projector system according to an exemplary embodiment of the present invention.

FIG. 1 is a block diagram of projector 1 according to an exemplary embodiment of the present invention.

As shown in FIG. 1, projector 1 comprises power source unit 9 which supplies power to projector 1, and display signal control unit 30 and is connected with host computer 13 via LAN (Local Area Network).

Display signal unit control unit 30 comprises interface 2 for used LAN for receiving a signal from host computer 13, control unit 3 which confirms the status of connection to host computer 13 via LAN interface 2, security operation unit 4 which starts security operation in case the connection to host computer 13 is disrupted, operation unit 10 on which multiple operation keys for operating projector 1 are provided, receiving unit 11 for receiving a control signal which shows the contents of an operation of projector 1 and which is sent from a remote control transmitter, and projection unit 100 for projecting an image.

A connection confirmation signal for confirming connection is inputted to LAN interface 2 from host computer 13. In addition, a connection confirmation request signal to request a connection confirmation signal in case a connection confirmation signal is not received may be outputted to host computer 13 from LAN interface 2.

Control unit 3 comprises CPU (central processing unit) 5 which executes predetermined processing in accordance with a program, and memory 6 for storing the program. In addition, security operation unit 4 comprises timer 7 which measures time, and security control unit 8 which controls power source unit 9.

The program stored in memory 6 shows the contents of the operation of CPU 5 corresponding to a signal inputted from LAN interface 2, operation unit 10 or receiving unit 11.

When a connection confirmation signal sent from host computer 13 is inputted, CPU 5 compares the connection confirmation signal with connection confirmation data stored in memory 6. When the connection confirmation signal agrees with the connection confirmation data, CPU 5 confirms the connection with host computer 13 and outputs a connection detection signal to timer 7.

In addition, if CPU 5 confirms that the connection confirmation signal has not been inputted to projector 1 for more than a predetermined time, CPU 5 outputs to timer 7 a measurement start signal indicating the start of the measurement of time.

When the measurement start signal is inputted from control unit 3, timer 7 starts measurement of time. When the measured time reaches a predetermined value, timer 7 outputs a measurement end signal to security control unit 8 indicating end of the measurement of time. Furthermore, when a connection detection signal is inputted from control unit 3, timer 7 resets the measured time.

When the measurement end signal is inputted, security control unit 8 outputs a supply stop signal to power source unit 9 indicating stop of power supply to projector 1.

Power source unit 9 comprise a circuit for supplying power to each of projection unit 100, LAN interface 2, control unit 3, security operation unit 4, operation unit 10 and receiving unit 11. The power supplied by power source unit 9 is obtained by inserting a plug for power supply (not shown) into a household socket. It can also be obtained from a battery (not shown) included in projector 1.

In response to the supply stop signal from security control unit 8, power source unit 9 stops the supply of power to projection unit 100, LAN interface 2, control unit 3, security operation unit 4, operation unit 10 and receiving unit 11.

Host computer 13 comprise interface 14 for used LAN which transmits a connection confirmation signal to projector 1, and control unit 15 which confirms connection of projector 1 to the LAN via LAN interface 14.

Control unit 15 comprises CPU 16 which executes processing in accordance with a program, and memory 17 for storing the program.

CPU 16 periodically sends a connection confirmation signal to projector 1 via LAN interface 14.

Next, the operation of the projector system of an exemplary embodiment will be described.

First, host computer 13 sends a connection confirmation signal to projector 1.

When cable 12 used for LAN is removed from projector 1 and control unit 3 confirms that a connection confirmation signal has not been inputted for more than a predetermined time, control unit 3 outputs a measurement start signal to timer 7. Accepting upon receipt of the measurement start signal, timer 7 starts measurement of time. Subsequently, when the measured time reaches a predetermined value, timer 7 outputs a measurement end signal to security control unit 8.

Accepting upon receipt of the measurement end signal, security control unit 8 outputs a supply stop signal to power source unit 9. Then, accepting upon receipt of the supply stop signal, power source unit 9 stops the supply of power to projector 1. At this time, when the power source of projector 1 stays on, the power source of projector 1 turns off. When the power source of projector 1 stays off, the power source of projector 1 continues to stay off.

When projector 1 is connected to the LAN before the measured time reaches the predetermined time, control unit 3 detects a connection confirmation signal sent from host computer 13. When the connection is confirmed, control unit 3 outputs a measurement termination signal to timer 7. In response to the measurement termination signal, timer 7 terminates measurement of time and resets the measured time.

In addition, security control unit 8 stops a measurement termination signal to power source unit 9. After this, when control unit 3 receives, from operation unit 10 or receiving unit 11, a signal that causes the power source to turn on, control unit 3 controls power source unit 9 to start the supply of power to projector 1.

The above steps are performed over and over again. Therefore, in case of temporarily disconnecting LAN connection, if projector 1 is connected with LAN within a predetermined time, projector 1 will operate normally.

When control unit 3 confirms that the connection confirmation signal has not been inputted, a supply stop signal may be outputted directly to power source unit 9, but not via security operation unit 4. In this case, security operation unit 4 is not necessary, and the configuration of projector 1 can be simplified.

Control unit 3 controls the operational status of projector 1 in accordance with a signal indicating contents that are input to operation unit 10 or a signal indicating contents that are received by receiving unit 11. However, instead of the above configuration in which power supply is stopped by security operation unit 4, a configuration is also possible in which control unit 3 does not accept a signal from operation unit 10 and receiving unit 11. In this configuration also, because projector 1 can not be operated and because starting of the power supply is impossible, the same effect similar to the case of stopping the power supply can be obtained.

In the case of applying the configuration, in which control unit 3 does not accept a signal from operation unit 10 and from receiving unit 11, to the configuration using timer 7, the supply stop signal sent from security operation unit 4 to power source unit 9 is outputted to control unit 3.

A configuration is also possible in which timer 7 of security operation unit 4 is a watchdog timer. Namely, timer 7 always measures the time and control unit 3 outputs a timer reset signal in place of the measurement start signal when a connection with host computer 13 is confirmed. If the timer reset signal continues to be received within a time in which the measured time of timer 7 does not exceed a predetermined value (If a connection with host computer 13 continues to be confirmed), the measured time of timer 7 will not exceed a predetermined value and the security function will not operate.

Figure 2:
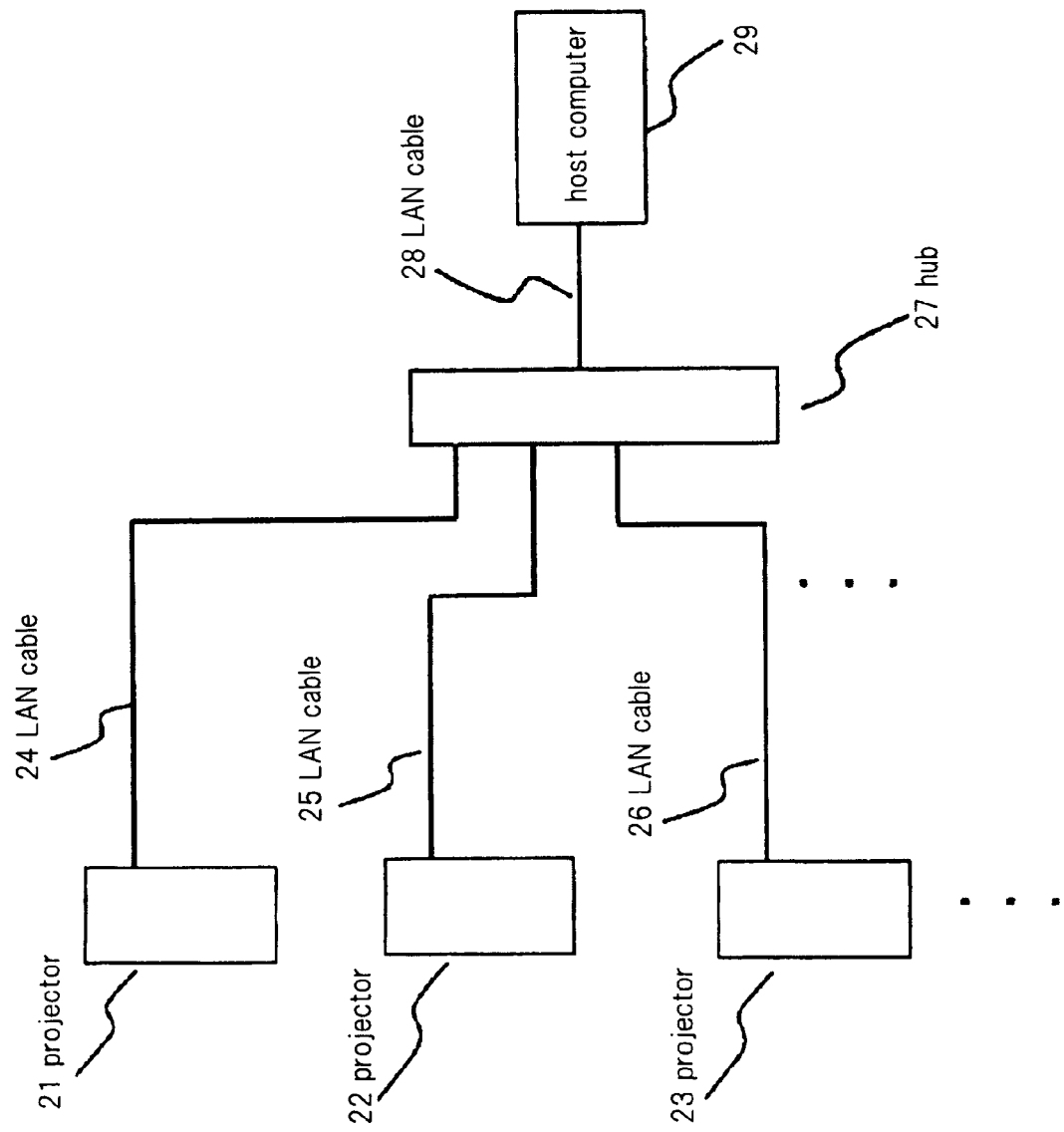
FIG. 2 is a schematic diagram showing an example of a projector system which monitors a plurality of projectors.

The number of projectors to which the host computer sends a connection confirmation signal is not limited to one. There may be a plurality of projectors. FIG. 2 is a schematic diagram showing an example of the case of the projector system monitoring a plurality of projectors.

In order to monitor a plurality of projectors, hub 27, which is a line concentrator of cables for LAN, is used. At one end of hub 27, cables 24 to 26 which are for used LAN and which are connected to projectors 21 to 23, respectively, are connected. At the other end of hub 27, host computer 29 is connected via LAN cable 28.

Projectors 21 to 23 confirm connection confirmation signals respectively which are transmitted from host computer 29. Then, only when a connection with host computer 29 via LAN is confirmed, can pictures be projected.

It is also possible that, when detecting a connection confirmation signal before the measured time of timer 7 reaches the predetermined value, control unit 3 outputs a request signal indicating a request to stop the security operation, to host computer 13 via LAN cable 12.

In the above case, control unit 13 transmits a response signal indicating permission to stop the security operation, to projector 1. Then, when confirming input of a response signal, control unit 3 outputs a measurement termination signal to timer 7 indicating reset of the measured time. When this measurement termination signal is inputted, timer 7 resets the measured time.

It is also possible that, when a connection confirmation signal is detected before the measured time of timer 7 reaches the predetermined value, and a predetermined key code is inputted, control unit 3 outputs a measurement termination signal to timer 7. In this case, it is assumed that the key code can be inputted by the operation keys provided for operation unit 10.

According to a projector of this exemplary embodiment, the projector cannot operate normally unless a connection confirmation signal which is transmitted from a host computer is repeatedly detected. Thus, even if stolen, the projector cannot be used alone or in other network systems. Therefore, it is possible to enhance determent from theft.

According to the present invention, the security of a projector can be confirmed based on whether the projector is connected to a host computer via a network. Therefore, implementing security measures against theft can be obtained by using a simple configuration.

While the invention has been particularly shown and described with reference to exemplary embodiments thereof, the invention is not limited to these embodiments. It will be understood by those of ordinary skill in the art that various changes in form and details may be made therein without departing from the scope of the present invention.

This application is based upon and claims the benefit of priority from Japanese patent Application No. 2006-294274 filed on Oct. 30, 2006, the disclosure of which is incorporated herein in its entirety by reference.

The invention claimed is:

1. A network projector connected with a host computer via a wired local area network (LAN) comprising:
   a power source unit which supplies power to said network projector; and
   a display signal control unit which, when confirming that a connection confirmation signal, which is transmitted at a fixed period from the host computer via the wired LAN, is not inputted for more than a first predetermined time, outputs a supply stop signal to said power source unit indicating that a supply of power should be stopped,
   wherein said display signal control unit comprises:
      a timer which starts measurement of time when a measurement start signal indicating start of measurement of time is inputted, outputs a measurement end signal indicating that the measurement of time ends when the measured time reaches a second predetermined time, and is reset by input of a connection detection signal;
      a security control unit which outputs said supply stop signal to said power source unit when said measurement end signal is inputted; and
      a control unit which outputs said connection detection signal to said timer when detecting said connection confirmation signal, and outputs said measurement start signal to said timer when confirming that said connection confirmation signal has not been inputted within a time period during which the first predetermined time has elapsed after a cable for the wired LAN has been removed from said network projector.

2. The network projector according to claim 1, wherein said control unit sends a request signal to said host computer indicating a request to stop a security operation, when detecting said connection confirmation signal before said measured time reaches said second predetermined time, and outputs a measurement termination signal to said timer indicating termination of the measurement of time when receiving a response signal in response to said request signal.

3. The network projector according to claim 1, wherein said display signal control unit further comprises an operation unit which accepts keyed-in input, and
   said control unit outputs a measurement termination signal to said timer indicating termination of the measurement of time when detecting said connection confirmation signal before said measured time reaches said second predetermined time and confirms input of a preset key code sent from said operation unit.

4. The network projector according to claim 1, wherein said display signal control unit further comprises an operation unit which accepts keyed-in input,
   wherein said security control unit outputs said supply stop signal to said control unit in place of said power source unit when said measurement end signal is inputted, and
   wherein said control unit controls an operation of said projector in accordance with an input signal indicating the contents of an input to said operation unit, and does not accept said input signal when said supply stop signal has been inputted.

5. The network projector according to claim 1, wherein said display signal control unit further comprises a local area network interface which is coupled to the control unit and receives a signal from said host computer.

6. The network projector according to claim 1, wherein said display signal control unit further comprises a receiving unit which is coupled to the control unit and receives a control signal, said control signal showing a content of an operation of the projector.

7. The network projector according to claim 1, wherein said display signal control unit further comprises a projection unit which is coupled to the control unit and the projects an image.

8. The network projector according to claim 5, wherein said supply stop signal causes said power source unit to stop the supply of power to said projection unit, said local area network interface, said control unit, and said security operation unit.

9. The network projector according to claim 1, wherein said host computer comprises a local area network interface which transmits said connection confirmation signal to said projector, and a second control unit, which confirms a connection of said projector to said wired LAN via said local area network interface.

10. A network projector connected with a host computer via a wired local area network(LAN), the network Projector comprising:
    an operation unit which accepts keyed-in input;
    a timer which starts measurement of time when a measurement start signal indicating start of measurement of time is inputted, outputs a measurement end signal indicating that the measurement of time ends when the measured time reaches a first predetermined time, and is reset by input of a connection detection signal; and
    a control unit which controls the operation of said network projector in accordance with an input signal indicating contents of an input to said operation unit, and outputs said connection detection signal to said timer when detecting a connection confirmation signal which is transmitted at a fixed period from the host computer via the wired LAN, outputs said measurement start signal to said timer when confirming that said connection confirmation signal has not been inputted within a time period during which a second predetermined time has elapsed after a cable for the wired LAN has been removed from the network projector, and does not accept said input signal when said measurement end signal is inputted.

11. The network projector according to claim 10, wherein said control unit sends a request signal to said host computer indicating a request to stop a security operation when detecting said connection confirmation signal before said measured time reaches said first predetermined time, outputs a measurement termination signal to said timer indicating termination of the measurement of time when receiving a response signal in response to said request signal.

12. The network projector according to claim 10, wherein said control unit outputs a measurement termination signal to said timer indicating termination of the measurement of time when detecting said connection confirmation signal before said measured time reaches said first predetermined time and confirms input of a preset key code sent from said operation unit.

13. A projector system comprising a network projector and a host computer connected via a wired local area network (LAN) wherein, said host computer comprises a first control unit which transmits a connection confirmation signal at a fixed period via the wired LAN, and wherein said network projector comprises:
    a power source unit which supplies power to the network projector; and
    a display signal control unit which, when confirming that said connection confirmation signal is not inputted for more than a first predetermined time, outputs a supply stop signal to the power source unit indicating that the supply of power should be stopped, and wherein said display signal control unit comprises:
    a timer which starts measurement of time when a measurement start signal indicating start of measurement of time is inputted, outputs a measurement end signal indicating that the measurement of time ends when the measured time reaches a second predetermined time and is reset by input of a connection detection signal;
    a security control unit which outputs said supply stop signal to said power source unit when said measurement end signal is inputted; and
    a second control unit which outputs said connection detection signal to said timer when detecting said connection confirmation signal, and outputs said measurement start signal to said timer when confirming that said connection confirmation signal has not been inputted within a time period during which the first predetermined time has elapsed after a cable for the wired LAN has been removed from said network projector.

14. The projector system according to claim 13, wherein said LAN further comprises a hub which forms a connection between said host computer and a plurality of network projectors including said network projector, and wherein said plurality of network projectors confirm their respective connection with said host computer.

\* \* \* \* \*